United States Patent [19]

Tolman

[11] 4,244,441

[45] Jan. 13, 1981

[54] BROAD BAND ACOUSTIC ATTENUATOR

[75] Inventor: Alan G. Tolman, Phoenix, Ariz.

[73] Assignee: The Garrett Corporation, Los Angeles, Calif.

[21] Appl. No.: 62,383

[22] Filed: Jul. 31, 1979

[51] Int. Cl.3 ............................ F01N 1/00; F02K 1/00

[52] U.S. Cl. .................................... 181/213; 181/296; 60/262

[58] Field of Search ............... 181/213, 214, 217, 218, 181/222, 264; 60/224, 262

[56] References Cited

U.S. PATENT DOCUMENTS

| | | | |
|---|---|---|---|
| 2,844,001 | 7/1958 | Alford . | |
| 2,988,302 | 6/1961 | Smith . | |
| 3,215,172 | 11/1965 | Ardoin . | |
| 3,437,173 | 4/1969 | Ehrich . | |
| 3,848,697 | 11/1974 | Jannot et al. . | |
| 3,905,445 | 9/1975 | Schaoton | 181/213 |

FOREIGN PATENT DOCUMENTS 252223 5/1964 Australia .

OTHER PUBLICATIONS

Winston E. Kock, "Sound Waves and Light Waves," Doubleday & Co., 1965, pp. 42–47, 66–68 and 99–102.

Air Force Report AFAPL-TR-76-65-vol. I, "The Generation and Radiation of Supersonic Jet Noise," 1976, p. 82.

Leo L. Beranek, ed., "Noise Reduction," McGraw-Hill, 1969, p. 681.

Sound and Vibrations Magazine, 1974, pp. 30–34.

*Primary Examiner*—George H. Miller, Jr.
*Assistant Examiner*—Benjamin R. Fuller
*Attorney, Agent, or Firm*—James W. McFarland; Albert J. Miller

[57] ABSTRACT

A broad band acoustic attenuator particularly useful for attenuating gas turbine engine noise utilizes a plurality of axially extending, open-ended, perforated cylinders concentrically arranged within the exhaust duct of the gas turbine engine for attenuating noise therefrom without imposing significant back pressure penalties.

19 Claims, 8 Drawing Figures

BROAD BAND ACOUSTIC ATTENUATOR

BACKGROUND OF THE INVENTION

This invention relates to acoustic attenuators and relates more particularly to an improved attenuator for reducing acoustic noise in gas turbine engines.

The present invention is concerned with the attenuation of noise generated by gas turbine engines, in contrast to various prior art attenuators, mufflers or the like, that are concerned with reduction in jet noise generated in the atmosphere by the exhaust flow from a gas turbine engine. Various theoretical studies have been conducted to determine the different sources of noise from the gas turbine engine itself. This noise is relatively broad band in nature extending throughout the audible frequency range. It is believed that boundary layer flow is a source of low frequency noise, while at least prominent high frequency noise peaks appear related to the turbine blade passing frequency. Various harmonics of these and other noise sources result in a relatively broad band acoustic noise spectrum.

Many prior art attempts to reduce gas turbine engine noise have centered about introduction of cooling airflow into the hot gas exhaust flow from the engine to reduce and/or better homogenize exhaust flow temperature once its thrust and/or work has been accomplished. In many instances however, it is impractical or too costly to make provisions for introduction of cooling air flow into the hot exhaust gas. Many other prior art attempts have centered about deswirling the exhaust gas flow to reduce noise sources. Generally these prior art arrangements increase back pressure on the exhaust gas flow to reduce overall engine efficiency, and/or alter the pattern of exhaust flow which in many instances may be aerodynamically undesirable. For instance, previous attempts to reduce engine noise by minimizing thermal gradients in the exhaust flow characteristically impose significant back pressure penalties. Many times these prior art structures are also characterized by relatively bulky, expensive, heavy and complicated muffler absorption devices.

SUMMARY OF THE INVENTION

The present invention contemplates utilization of a plurality of axially extending, open-ended, perforated metal cylinders located concentrically within the exhaust duct from a gas turbine engine. The cylinders produce minimal back pressure to the exhaust gas flow and yet are relatively arranged to the turbine of the engine and to one another so as to provide broad band acoustic attenuation of the engine generated noise. Preferably, the concentric cylinders are of differing axial length with the longest one in the center-most location and with the outer ends of the several cylinders lying on a truncated conical surface whose included solid angle is preselected in relation to the turbine blade passing frequency. In this manner the present invention provides an acoustic wave guide structure that is effective in refracting and/or reflecting acoustic energy toward energy absorption surfaces which may be utilized in conjunction therewith. Additionally, the concentric cylinder arrangement reduces temperature gradients within the exhaust gas flow to further attenuate engine noise without imposing severe back pressure penalties thereon. The shortest, outmost perforated cylinder is preferably located quite close by to the outer exhaust duct wall to intercept exhaust gas flow shear layer boundary flow to attenuate the low frequency noise spectrum associated therewith.

Accordingly, it is a broad object of the present invention to provide an improved acoustic attenuation device and method particularly suitable for use in attenuating noise generated by a gas turbine engine.

It is a more particular object of the present invention to provide such an improved acoustic attenuation apparatus and method which imposes minimal back pressure penalties on the exhaust gas flow, yet provides broad band attenuation without utilization of bulky, cumbersome and/or expensive muffler structures, and/or without introduction of cooling air flow into the exhaust gas flow.

Another important object of the present invention is to provide attenuator structure and method which greatly improves the operation of an air cavity type muffler utilized in conjunction therewith, by properly directing the acoustic energy for maximum absorption by the absorption cavities of the muffler.

These and other objects and advantages of the present invention are specifically set forth in or will become apparent from the following detailed description of a preferred form of the invention when read in conjunction with the accompanying drawings.

DETAILED DESCRIPTION OF THE PREFERRED EMBODIMENT

Figure 3:
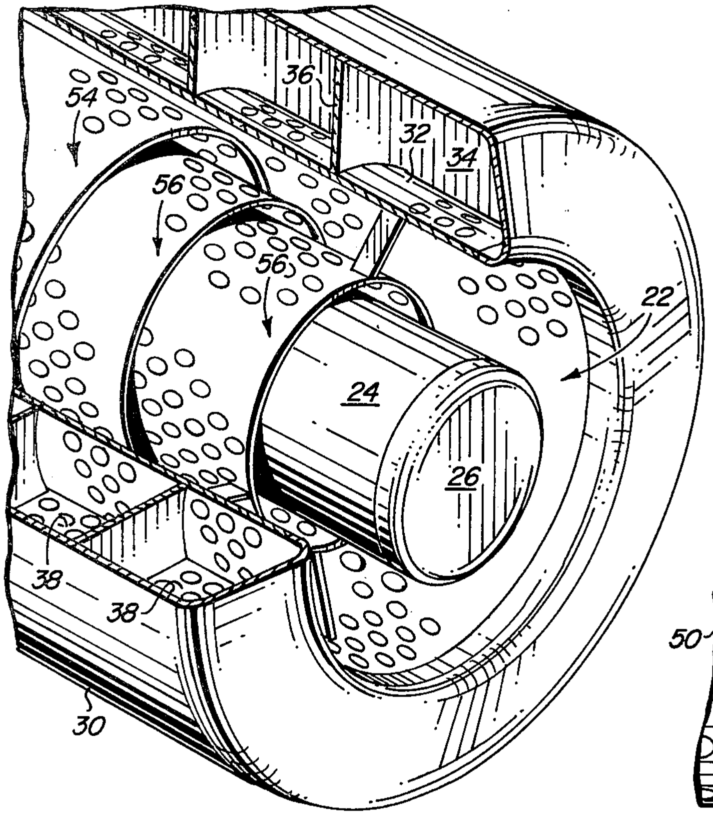
FIG. 3 is an enlarged, fragmentary perspective view of the exhaust end of the engine as shown in FIG. 2, with portions broken away to reveal internal details of construction.
Figure 1:
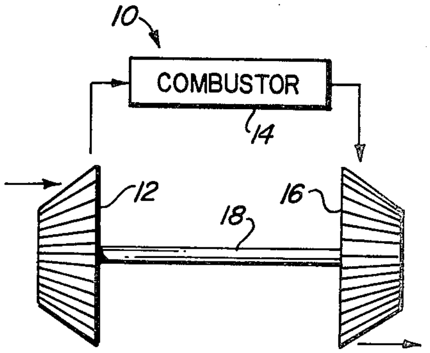
FIG. 1 is a schematic representation of a gas turbine engine.
Figure 4:
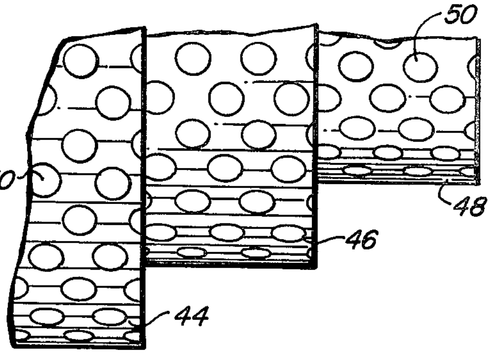
FIG. 4 is a further enlarged, fragmentary, elevational view of a portion of the perforated cylinders showing details of the aperture pattern.

Referring now more particularly to the FIGS. 1-4, a gas turbine engine 10 as illustrated in FIG. 1 basically includes a compressor section 12 which feeds compressed airflow to a combustor 14 for heating of the airflow, with exhaust gas from the combustor passing over and driving turbine means 16 which typically may include a plurality of serially arranged turbine stages. Conventionally at least one of the turbine stages drives the compressor 12 through associated shafting 18.

Figure 2:
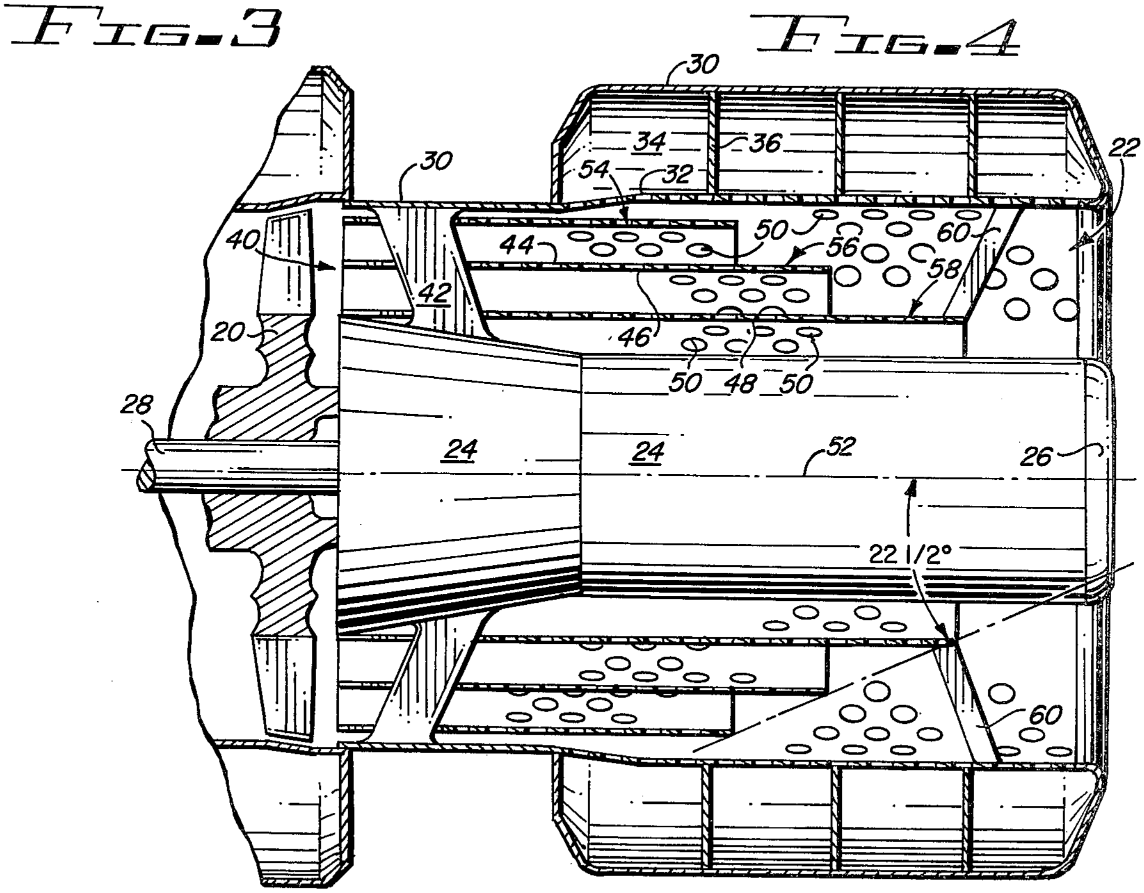
FIG. 2 is a fragmentary, elevational cross-sectional view of the exhaust end of a gas turbine engine as schematically illustrated in FIG. 1, and showing one form of the present invention.

As shown in FIG. 2 the final turbine stage 20 is located adjacent the exhaust end of the gas turbine engine. Swirling, heated exhaust gas flow exiting the final turbine stage 20 passes through an annularly shaped opening 40 to a cylindrical exhaust duct 22, ultimately exhausting from the entire engine at the right hand end as illustrated in FIG. 2. The annular configuration of the exhaust duct 22 is implemented by incorporation of a centrally located plug 24 extending throughout the axial length of the exhaust duct 22. The outer end of plug 24 is closed by a cap 26. As is conventional within the art, within plug 24 there may be included a variety of gear trains and/or auxiliary devices driven by shaft 28.

To assure that exhaust duct 22 receives only the heated exhaust gas flow from the engine, an exhaust or tail pipe is included which has an imperforate cylindrical outer wall 30. Additionally, extending axially along at least a portion of the exhaust duct 22 is a perforated inner wall 32 of the exhaust pipe which, in association with the closed wall 30, defines acoustical energy absorption cavities 34 to present an air cavity type muffler disposed in concentric surrounding relationship to at least a substantial portion of the exhaust duct 22. The separate air cavities 34 are defined by a variety of circumferentially extending baffles 36 as well as radially extending baffles 38. Dependent upon the type of energy absorption characteristics desired or required, some or all of the baffles 36, 38 may be perforated or impermeable. It will be apparent that the cylindrical apertured inner wall 32 in association with the left hand portion of imperforate wall 30 as illustrated in FIG. 2, together define the outer boundary of the cylindrical exhaust duct 22 which is of a diameter approximately equal to the larger diameter of the annularly shaped opening 40 from which hot core gas flow is exhausted from the last turbine stage 20 into the exhaust duct 22. The cylindrical central plug 24 defines the inner boundary of exhaust duct 22 and has a diameter approximately equal to the inner diameter of annularly shaped opening 40 so that all core exhaust flow from the engine passes from opening 40 into the exhaust duct 22. Stationary flow directing vanes such as illustrated at 42 may also be included both for altering the exhaust gas flow direction as well as for supporting the central plug 24. Other support struts as necessary extend across the exhaust duct 22 to support the central plug 24.

Disposed concentrically within the exhaust duct 22 are a plurality of relatively thin, open ended, axially extending, straight, perforated, regular cylinders 44, 46 and 48. Each of these cylinders has a regular pattern of equally sized apertures 50 throughout its entire surface, with the total area of the apertures on each cylinder being between about 40 and 50 percent of the total surface area. Preferably approximately 44 percent of the area of each of the cylinders is open by virtue of the apertures 50 therein. The first or largest diameter cylinder 44 lies in very closely spaced relationship to the outer boundary of the exhaust duct 22. The diameters of the three cylinders are preselected to present preselected radial spacings from the inner wall 32 associated with the muffler absorption cavities. Further, while the innermost ends of the three cylinders 44, 46 and 48 lie in a common plane transverse to the central axis 52 of the exhaust duct 22, and are preferably located closely adjacent the last turbine stage 20, the outermost ends of the three cylinders are located in a staggered relationship due to the differing axial lengths of the cylinders. Preferably, the outer ends of the three perforated cylinders lie in a common truncated conical surface of revolution, or hypothetical cone which has an internal included angle that is preselected relative to the turbine passing speed or rotational speed of the rotating turbines. For reasons set forth in greater detail below, in a preferred form of the invention this preselected angle is approximately 22.5 degrees. As a result of this staggered relationship each of the three cylinders 44, 46 and 48 respectively have different portions 54, 56 and 58 that are directly exposed to the perforated inner surface 32 associated with the air cavity type muffler. As necessary, support struts such as strut 60 are included to support the three cylinders in the preselected radial spacings within the exhaust duct 22. While a plurality of such support struts may be included, they are relatively thin and are of short axial length so as to minimize resistance to air flow through the exhaust duct 22. It is important to note that the annular zones or sections of the exhaust duct 22 defined between the several cylinders 44, 46 and 48 have no radial or circumferential baffles therewithin. Accordingly, the three cylinders may be included within existing hot gas exhaust ducts from gas turbine engines without significantly reducing the total cross-sectional area presented by the exhaust duct. In this manner the back pressure introduced on the engine is maintained at a minimum.

Figure 8:
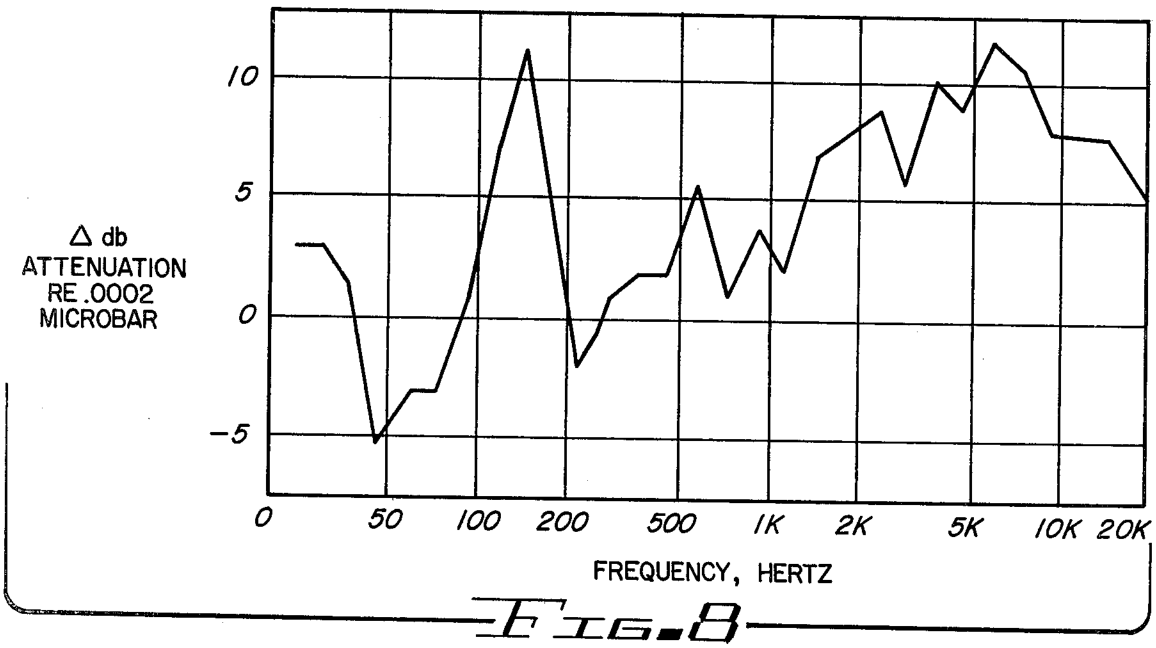
FIG. 8 is a graphical representation of broad band noise attenuation produced by the present invention in a typical application in a gas turbine engine.

In operation, air inflow is compressed by compressor 12 and delivered to the combustor 14 for combustion and heating thereof. The exhaust gas from the combustor passes across and drives the turbine means 16, including the last turbine stage 20 to develop the rotational power for driving compressor 12 as well as producing shaft power as appropriate dependent upon utilization of the engine. The annularly shaped, hot core exhaust gas flow leaves the last turbine stage 20 and exhausts through annularly shaped opening 40 into the exhaust duct 22. The arrangement, location, and configuration of the three perforated cylinders 44, 46 and 48 cooperate with the air cavity type muffler surrounding the exhaust duct to produce a broad band reduction in noise generated by the engine. A typical noise reduction across the entire audible frequency range is illustrated in FIG. 8. As noted, significant noise attenuation at low frequencies is produced by the present invention. It is believed that one factor in the low frequency noise attenuation is the location of the outermost cylinder 44 in very closely spaced relationship to the outer boundary of exhaust duct 22. Preferably, this outermost cylinder 44 is located sufficiently close so as to intercept the shear layer of boundary flow at the outer boundary of exhaust duct 22. It is believed that this interception promotes certain turbulence to tend to disrupt this shear layer and reduce low frequency noise. While this phenomenon and the operation of the present acoustical attenuator in reducing low frequency noise is not completely understood, it is possible that it might be explained as being analogous to noise associated with high speed flow over an aircraft surface. A turbulent boundary layer in a region near this surface such as the outer wall of the exhaust duct would tend to exert fluctuating pressures on the surface which travel therealong and set up vibration in the structural members to produce noise. Thus by alteration of the boundary layer it is believed that the location of the outer cylinder 44 closely adjacent the outer boundary of the exhaust duct assists in attenuating low frequency engine noise. Further, location of cylinder 44 is believed to have an effect on the swirl factor of the exhaust gas flow which assists in attenuating the noise.

The three perforated cylinders 44, 46 and 48 assist in promoting the elimination of thermal gradients in the exhaust gas flow to reduce noise. However, the cylinders are not arranged to deliberately deswirl the flow or otherwise produce an effect thereon which would tend to increase back pressure on the exhaust gas flow. Additionally, the cylinders tend to act as heat sinks further promoting elimination of temperature gradients. The regular, staggered hole pattern tends to generate a proper turbulence to promote a homogeneous temperature in the exhaust flow and at the same time also tends to break up or reduce formation of relatively large turbulent cells to further minimize low frequency noise, yet without introducing significant back pressure to the engine.

The staggered pattern of the several cylinders also greatly improves the performance of the muffler associated in surrounding relationship thereto. It is believed that the staggered relationship of the cylinders in axially length as well as the preselected different diameters produces a wave guide for the acoustic energy. The cylinders act as a diffraction grating for the acoustical wave energy impinging thereupon and, analogously to reflection and/or refraction of electromagnetic radiation, tend to properly reflect the different frequency components of the acoustic energy in directions toward the perforated surface 32 to greatly improve the absorption characteristics of the air cavity type muffler. For instance, once the acoustic noise energy is separated into different frequency packets, they are then reflected by the exposed portions 54, 56 and 58 towards the muffler. These surfaces 54, 56 and 58 can be located at preselected different distances from the surface 32 that can be related to the wave length of the frequencies being reflected such that they reach the surface 32 in a condition proper for absorption. Accordingly, by preselecting the angle of the truncated cone in relation to a known primary noise energy frequency source such as the turbine blade passing frequency, absorption and attenuation of the noise at these frequencies can be improved. Increasing the angle of the cone increase attenuation of higher and higher frequencies. Yet at the same time, this arrangement produces a broad band noise attenuation.

Examples of a theoretical discussion of the boundary layer noise absorption characteristics as well as the affect of swirl upon noise can be found in "Noise Reduction," ed. L. Beranek, p. 681, McGraw-Hill, 1969, as well as at page 82 of Air Force Report AFAPL-TR-76-65-Vol. I, "The Generation and Radiation of Supersonic Jet Noise," 1976. Discussion of noise wave propagation, noise wave guiding, reflection and/or refraction of sound waves can be found at pages 42–47, 66–68, and 99–102 of "Sound Waves and Light Waves," Winston E. Kock, Doubleday & Co., 1965. Noise generation is discussed generally in pages 30–34 of the magazine "Sound and Vibration," 1974.

From the above it will therefore be apparent that the present invention produces improved attenuation of noise generated by a gas turbine engine without imposing significant back pressure penalties on the engine. Further, this is accomplished without introduction of cooling airflow into the exhaust gas flow, and is also accomplished without introduction of radical alteration of the gas flow itself.

Further, it will also now be apparent that the present invention also provides an improved method of producing broad band acoustic attenuation within an annularly shaped, hot, core exhaust flow from a gas turbine engine. This method includes the splitting of the exhaust gas flow into axially concentric annular portions between the three cylinders 44, 46 and 48; utilizing these cylinders as heat sinks to reduce temperature gradients in the gas flow; absorbing a broad band of acoustic wave energy from the gas flow in air cavity type muffler associated therewith; and by separately reflecting acoustical wave energy from the different, exposed portions 54, 56 and 58 of the three cylinders in a direction and at a distance from the perforated surface 32 so as to greatly improve the energy absorption by the air cavities of the muffler.

Figure 5:
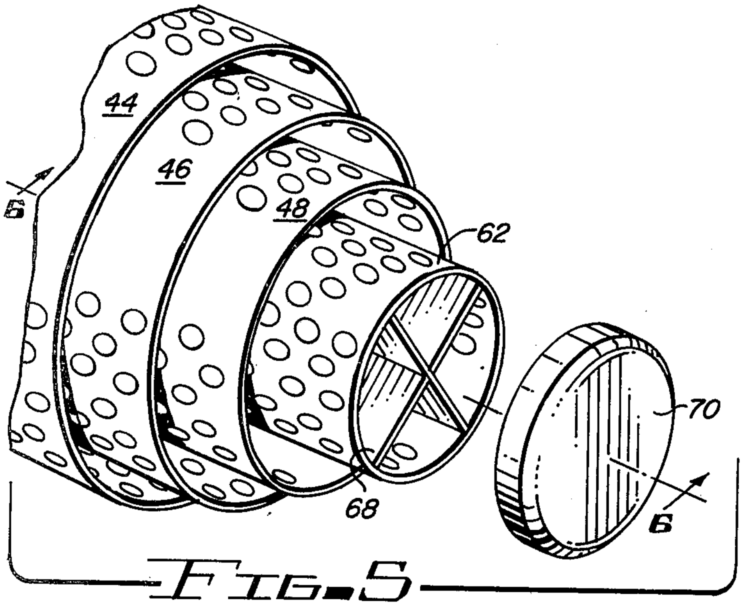
FIG. 5 is an exploded perspective view similar to FIG. 3 but showing another form of the invention.
Figure 7:
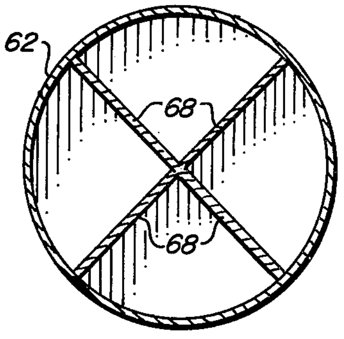
FIG. 7 is a cross-sectional view taken along lines 7—7 of FIG. 6.
Figure 6:
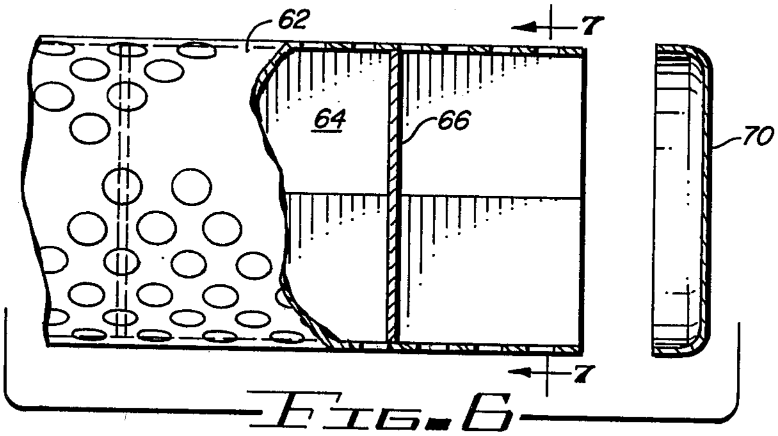
FIG. 6 is a plan view, shown partially in cross-section, as viewed along line 6—6 of FIG. 5.

FIGS. 5–7 illustrate a slightly modified form of the invention wherein in addition to the air cavity type muffler which surrounds the outer portion of the annular exhaust duct 22, the central plug is comprised of another preforated cylinder 62. Internally the cylinder 62 is divided into a plurality of separate acoustical wave energy absorption cavities 64 through both vertical partitions 66 as well as axially extending partitions 68. Preferably the outer end of the perforated plug 62 is closed by an impermeable cap 70.

Operation of this modified form of the invention is as set forth previously with respect to FIGS. 1–4. Additionally however, the perforated surface 62 and the associated air cavities 64 present additional acoustical wave energy absorption capabilities in certain applications.

Various alterations and modifications of the above described structures will be apparent to those skilled in the art. Accordingly, the foregoing detailed description of preferred forms of the invention should be considered exemplary in nature and not as limiting to the scope and spirit of the invention as set forth in the appended claims.

Having described the invention with sufficient clarity that those skilled in the art may make and use it, what is claimed is:

1. An acoustic attenuator for heated exhaust gas from a gas turbine engine having a compressor, a combustor for heating compressed air from the compressor, turbine means driven by heated gases from the combustor, and a cylindrical exhaust duct for receiving only heated exhaust gases from said turbine means substantially without mixture with cooling fluid flow, said attenuator comprising:

a plurality of open-ended cylinders extending axially within said cylindrical exhaust duct and substantially concentrically arranged within said exhaust duct, each of said cylinders having a regular pattern of equally sized apertures throughout the entire surfaces thereof, the total area of said apertures being no more than approximately one half the full surface area of said cylinders.

2. An acoustic attenuator as set forth in claim 1 further including an axially extending plug having a closed outer-end, said plug mounted centrally within the innermost of said concentric, open-ended cylinders and defining the inner boundary of said exhaust duct.

3. An acoustic attenuator as set forth in claim 2 wherein said concentric cylinders are of differing axial lengths.

4. An acoustic attenuator as set forth in claim 3, wherein said plurality of concentric cylinders comprise at least three cylinders.

5. An acoustic attenuator as set forth in claim 4, wherein the total area of said aperture is between approximately 40 percent and 50 percent of said full surface area of said cylinders.

6. An acoustic attenuator as set forth in claim 5, wherein said total open area of the apertures is approximately 44 percent.

7. An acoustic attenuator as set forth in claim 4, further comprising an air cavity type muffler extending axially and in surrounding relationship to said exhaust duct, said muffler having a perforated internal surface defining the outer boundary of said exhaust duct.

8. An acoustic attenuator as set forth in claim 7, wherein the axially shortest of said open-ended cylinders is the outermost of said concentrically arranged cylinders while the axially longest of said cylinders is said innermost cylinder.

9. An acoustic attenuator as set forth in claim 8, wherein each of said cylinders is relatively arranged to present portions thereof directly exposed to said inner surface of the muffler, said exposed portions being of preselected axial length at differing preselected radial spacings from said inner surface of the muffler whereby said exposed portions act as acoustic wave guides for reflecting acoustic wave energy in said exhaust gas flow in a direction toward said muffler internal surface for improved absorption by said muffler of said acoustic wave energy.

10. An acoustic attenuator as set forth in claim 9, wherein said cylinders are arranged with their outer ends lying substantially on a truncated conical surface having an included angle preselected in relation to the normal operating speed of said turbine means, said truncated conical surface having its apex located on the central axis of said cylindrical exhaust duct.

11. An acoustic attenuator as set forth in claim 10, wherein said preselected included angle is approximately 22.5 degrees.

12. An accoustic attenuator as set forth in claim 10, wherein said cylinders are arranged with their inner ends closely adjacent said turbine means.

13. An acoustic attenuator as set forth in claim 8, wherein said outermost cylinder is sufficiently closely spaced to said outer boundary of the exhaust duct to intercept the shear layer of boundary flow of exhaust gas at said outer boundary.

14. In a gas turbine engine generating a swirling, annularly shaped, hot, core exhaust gas flow through an axially extending, cylindrical exhaust duct: a broad band acoustic attenuator for reducing exhaust noise without introduction of cooling fluid flow into said duct, comprising a plurality of straight, axially extending, open-ended cylinders of different preselected diameters arranged concentrically in said exhaust duct and receiving only said hot core exhaust gas flow, each of said cylinders having a regular pattern of equally sized apertures, the largest diameter cylinder being sufficiently closely arranged to the internal surface of said exhaust duct to promote deswirling and mixing of said core exhaust gas flow thereat to reduce temperature gradients in said core exhaust gas flow, said apertures in each of said cylinders presenting approximately 40 percent and 50 percent open area in each of said cylinders, said cylinders being relatively thin whereby said attenuator produces minimal backpressure on said core exhaust gas flow.

15. An acoustic attenuator for a gas turbine engine, comprising:
- an axially extending, air cavity muffler having an open internal space receiving axially flowing, swirling, heated gas from said engine, said muffler having a perforated cylindrical internal surface; and
- at least three open-ended cylinders mounted within said internal space concentrically to said internal surface, each of said cylinders having a regular pattern of apertures throughout the entire surface thereof, the total area of said apertures being less than approximately fifty percent of the total surface area of said cylinders, said cylinders being of different axial lengths and diameters, said lengths and diameters of the cylinders being relatively matched to present portions of each cylinder directly exposed to said internal surface of the muffler, said exposed portions being sized and arranged to act as acoustic wave guides for reflecting acoustic waves from said exhaust gas flow toward said internal surface for improved absorption of said acoustic waves by said muffler.

16. In a gas turbine engine generating a swirling, annularly shaped, hot, core exhaust gas flow through an exhaust duct having a straight, axially extending, cylindrical internal wall:
- at least three axially extending, open-ended, straight cylinders of different diameters disposed concentrically in said exhaust duct, each of said cylinders having a regular pattern of equally sized apertures together covering less than fifty percent of the area of each cylinder, said cylinders being of differing axial lengths and relatively arranged to present portions of each cylinder exposed to said internal wall at differing radial distances therefrom, whereby said differing exposed portions act as acoustic wave guides reflecting acoustic wave energy of said core exhaust gas flow outwardly toward said internal wall of the exhaust duct.

17. A gas turbine engine comprising:
- a compressor for compressing an airflow;
- a combustor receiving at least a portion of said airflow and heating same;
- turbine means driven by heated gas flow from said combustor;
- a cylindrical exhaust duct receiving an annularly shaped hot exhaust gas flow from said turbine means;
- an air cavity type muffler extending axially and in surrounding relationship to said exhaust duct, said muffler having a perforated internal surface defining the outer boundary of said exhaust duct;
- an axially extending plug having a closed outer end, said plug mounted concentrically within said exhaust duct and defining the inner boundary of said exhaust duct; and
- a plurality of open-ended cylinders of regular cylindrical configuration mounted symmetrically within said inner and outer boundaries of said exhaust duct, said cylinders having a regular pattern of equally sized apertures across substantially the entire surfaces thereof, said cylinders having inner ends disposed nearest said turbine lying in a common plane, said cylinders being of differing axial lengths with opposite outer ends disposed at differing axial distances from said turbine to present portions of each cylinder directly exposed to said internal surface of the muffler, said exposed portions being of preselected axial length and being spaced different preselected radial distances from said internal surface to act as acoustic wave guides for reflecting acoustic wave energy in said exhaust gas flow in a direction toward said muffler internal surface for improved absorption by said muffler of said acoustic wave energy.

18. In a gas turbine engine generating a swirling, hot core exhaust gas flow from an annularly shaped opening about a central plug, a broad band acoustic attenuator comprising:

an axially extending cylindrical exhaust pipe secured to said engine and surrounding said opening for receiving only said hot core exhaust flow, said pipe having cylindrical outer and inner walls respectively having diameters greater than and approximately equal to the outer diameter of said annularly shaped opening, said inner wall being perforated;

a plurality of baffles extending perpendicularly between said inner and outer walls of said exhaust pipe to present acoustically attenuating, separate air cavities for absorbing acoustical wave energy from said core exhaust flow through said perforated inner wall;

a first open-ended cylinder of first preselected axial length mounted to said exhaust pipe concentrically within said inner wall, said first cylinder having a first diameter slightly less than said diameter of the inner wall to promote interception of the shear layer of core exhaust flow adjacent said inner wall, said first cylinder having a regular pattern of equally sized apertures having a total area of between approximately forty and fifty percent of the area of said first cylinder, said apertures promoting turbulence and deswirling of said core exhaust flow for reducing temperature gradients therein;

a second open-ended cylinder of second, longer axial length and second, smaller diameter than said first cylinder and mounted concentrically therewithin to present a portion of said second cylinder directly exposed to said inner wall, said second cylinder also having said regular pattern of equally sized apertures having a total area of between approximately forty and fifty percent of the area of said second cylinder, said exposed portion of the second cylinder arranged and located to reflect acoustical wave energy from core exhaust flow passing between said first and second cylinders outwardly toward said inner wall in a direction promoting absorption by said air cavities of said reflected acoustical waves;

a third open-ended cylinder of third axial length longer than said second cylinder and of third diameter smaller than said second cylinder, said third cylinder mounted concentrically within said second cylinder to present a portion of said third cylinder directly exposed to said inner wall also arranged and located to reflect acoustical wave energy from core exhaust flow passing between said second and third cylinders outwardly toward said inner wall in said direction, said pattern of said equally sized apertures having a total area of between approximately forty and fifty percent of the total area of said third cylinder; and a cylindrical, closed-ended, central plug of smaller diameter and longer axial length than said third cylinder, said plug mounted concentrically within said third cylinder and having a diameter approximately equal to the inner diameter of said annularly shaped opening.

19. A method of providing broad band acoustic attenuation in an annularly shaped, hot, core exhaust gas flow from a gas turbine engine, comprising:

splitting said exhaust gas flow into axially flowing concentric annular portions separated by perforated, open-ended, axially extending cylinders;

utilizing said cylinders as heat sinks for absorbing heat from said exhaust flow to reduce temperature gradients in said exhaust gas flow;

absorbing broad band acoustic wave energy from said exhaust gas flow in an air cavity muffler surrounding said exhaust gas flow; and separately reflecting acoustic wave energy from said annular portions of the exhaust gas flow from different portions of said perforated cylinders directly exposed to said muffler, in a direction toward said muffler for improved absorption by the muffler of the reflected wave energy.

* * * * *